United States Patent
Hill et al.

(10) Patent No.: US 6,961,429 B1
(45) Date of Patent: Nov. 1, 2005

(54) METHOD AND DEVICE FOR GUARANTEEING THE INTEGRITY AND AUTHENTICITY OF A SET OF DATA

(75) Inventors: Michael John Hill, Coppet (CH); Marco Sasselli, Chardonne (CH); Christophe Nicolas, Préverenges (CH)

(73) Assignee: Nagravision S.A., Lausanne (CH)

( * ) Notice: Subject to any disclaimer, the term of this patent is extended or adjusted under 35 U.S.C. 154(b) by 990 days.

(21) Appl. No.: 10/031,178

(22) PCT Filed: Jun. 23, 2000

(86) PCT No.: PCT/IB00/00847

§ 371 (c)(1),
(2), (4) Date: Jan. 16, 2001

(87) PCT Pub. No.: WO01/11820

PCT Pub. Date: Feb. 15, 2001

(30) Foreign Application Priority Data

Aug. 4, 1999 (CH) ..................... 1438/99

(51) Int. Cl.⁷ .......................................... H04N 7/167
(52) U.S. Cl. ................. 380/200; 380/232; 713/155
(58) Field of Search ................ 713/155, 156; 380/200, 232

(56) References Cited

U.S. PATENT DOCUMENTS

| 5,625,693 | A | * | 4/1997 | Rohatgi et al. ............. 713/187 |
| 6,061,449 | A | * | 5/2000 | Candelore et al. ........... 380/28 |
| 6,201,798 | B1 | | 3/2001 | Campanella et al. |
| 2001/0048669 | A1 | | 12/2001 | Dillon |

FOREIGN PATENT DOCUMENTS

| DE | 100 31 178 A1 | 1/2002 |
| EP | 0689316 A | 12/1995 |
| EP | 0723371 A | 7/1996 |
| EP | 0752786 A | 1/1997 |
| WO | WO 99 07150 A | 2/1999 |

* cited by examiner

*Primary Examiner*—Gregory Morse
*Assistant Examiner*—Jacob Lipman
(74) *Attorney, Agent, or Firm*—Woodard, Emhardt, Moriarty, McNett & Henry LLP

(57) ABSTRACT

Method and a device for guaranteeing the integrity and authenticity of data transmitted between a management center and one or several receiver units, wherein each receiver unit comprises a decoder (IRD) and a security unit (SC) and means for communicating (NET, REC) with the management center. The method consists in calculating a check information (Hx) representative of the result of a unidirectional and collision-free function, performed on all or part of the transmitted data and in transmitting the result to the management center for verification. The center will be able to inform the decoder concerning the authenticity of the data through return channels or through the main channel.

16 Claims, 1 Drawing Sheet

METHOD AND DEVICE FOR GUARANTEEING THE INTEGRITY AND AUTHENTICITY OF A SET OF DATA

FIELD OF THE INVENTION

This invention concerns the field of the control of the integrity and authenticity of data, and in particular the downloading of software.

The invention is applied to all those apparatuses that contain at least one central unit such as those currently used in information technology, that is to say, with a processor that has at least a part of its program inside a rewrite memory.

BACKGROUND OF THE INVENTION

It is well known that the alteration or the damage of data leaves traces in certain parts of the information processed and stored in a memory, either before or after being processed. It is also known that a simple mathematical technique such as "checksum" is used in order to determine if the data taken into consideration has been modified by establishing a checksum reference.

However, it is possible that the control system has also been altered and that it is no longer able to verify the contents of its memory. Thus, during the course of mathematical operations, the propagation of compensatory random errors may occur, giving an identical result to the one expected. Consequently, verification by the known methods will be inoperative in certain cases.

There is, therefore, a problem that is not solved in a satisfactory manner, which consists in improving the reliability and the security achieved by the known verification methods, particularly when the same unit is in charge of calculating its own checksum and of comparing it with a reference value.

It is well known that, in order to render all data modifications visible, a mono-directional operation is used on the data, that is, an operation that is easy to perform in one direction but almost impossible to perform in the other direction. For example, the operation $X^Y$ is easy to carry out, while the operation $\sqrt[Y]{X}$ is much more difficult.

The term collision-free operation means an operation according to which any different combination of data that is entered gives a similar result.

Within the sphere of this invention, this mono-directional operation is a mathematical application H of a source group towards an object group, in which each x element of the source group is attributed with an $H_{(x)}$ symbol. These functions are particularly useful when there are functions known as Hash, as they are defined on page 27 of the RSA Laboratories publication "Frequently Asked Questions About Today's Cryptography, v.4.0". The x element can be of any length, but $H_{(x)}$ always has a series of characters of a fixed length (fixed-size string). Such a function is difficult to invert, that is to say, knowing H(x) does not generally mean that x can be found. It is said to be more collision-free when it is injective, that is, that $H_{(Y)}=H_{(x)}$ leads to y=x, or $H_{(Y)}\approx H_{(x)}$ leads to y≠x.

SUMMARY OF THE INVENTION

The aim of this invention is to guarantee that the information contained in a pay-T.V. decoder is, on the one hand, that which the control center has transmitted and, on the other hand, has not been altered.

The aim is achieved through the use of a method to check the integrity and authenticity of a set of memorized data (M1 to Mn) in a pay-T.V. decoding unit, consisting of a decoding unit and a security unit, along with a means of communication (NET, REC) with a control center.

This method consists in:
 transmitting the data (M1 to Mn) to the security unit;
 calculating a check information ($H_x$) representative of the result of a function called mono-directional and collision-free, carried out on all or only a part of the data (M1 to Mn);
 ciphering the check information (Hx) with a first cipher-key (k1);
 establishing the conformity of the check information (Hx) by way of a communication to the control center by one of the means of communication.

In this way, the integrity of the data is no longer checked exclusively by the decoding unit in which the data is stored, but is guaranteed by an external unit, considered impenetrable, the security unit.

According to this invention, the decoder itself can carry out the calculations and transmit the results to the security unit, or transmit the data M1 to Mn to the security unit which will than carry out the calculation of the Hash information.

The cipher-keys used to cipher the information with the control center are contained exclusively in the security unit. The decoder does not have the means to decipher these messages and so modify the data transmitted by the control center when the same messages pass through the decoder.

These security units are generally in the form of smart-cards, and include a memory, a microprocessor and a means of communication.

By means of communication we mean either a two-directional connection by a cable, a modem outlet or a Hertzian-wave connection. The principle means of carrying the data and on which messages directed to the security module are forwarded is included in this term.

The verification operation of the conformity of the check information (Hx) may be carried out in various ways.

The security module sends the ciphered check information to the control center, the latter being in charge of carrying out the verification. In the reply, the control center may send either a simple result of the comparison OK/NOK, or send the reference value. All these messages are ciphered by a cipher-key of the security module.

The control center memorizes the result with reference to each subscriber unit as proof of the correct functioning of the downloading operation or, contrarily, of the alteration of the data in view of a repetition, for example.

According to a variation of the invention, the control center may first send the reference value directly to the security units. In this way, it will not be necessary to ask the control center to verify the conformity of the calculated check information, Hx.

With another operational method, and when a verification request comes from a security unit, the control center sends, as a comparison result, the reference value (Hy) in a ciphered form k2(Hy) to the security unit. Once this is done, the control center does not only inform the security unit whether it is correct or not, but sends the reference value to the security unit. It will be done mainly if the comparison has given a positive result so that the security unit can memorize the reference value Hy.

The sending of this information can be carried out by an auxiliary means of communication such as a modem, or by the main data path.

In the case where the data M1 to Mn is already accompanied by a means of verification, such as CRC, Checksum or Hash, the decoding unit may carry out an initial test with the means contained inside it. None the less, the reliability of this test is to create a doubt, that is, if the data has been modified by a third person, it is certain that that person will have modified the verification means in the same way. This is because, with this method of the invention, the security unit can inform the decoding unit not to accept the test result as a guarantee of the authenticity of the data, but that the authenticity is determined according to the method described further on.

This variation is important in the case of the updating of a number of decoders, some of which of an old generation operating system type and in need of a Checksum verification, or others that have already been equipped for the system according to the method claimed herein.

When updated software is downloaded, it is quite common to send only the part that has been modified. The data M1 to Mn does not represent the whole newly-updated program. This is because, in order to maintain a reliable means of verifying the whole program, it is important to have an H'y reference value available that is representative of a Hash function in the newly created program.

There is a first method which consists in establishing the initial integrity of a program P0, that is, before being updated. To do this, the initial results H0 of the Hash function in the program P0 are either initialized on installing the program or established according to the method in this invention.

When the authenticity of the data of the update has been established and have been introduced into the memory program, the security unit can immediately order a Hash function to be carried out on the whole of the new program P1 giving the result H1. This result will be needed for the following checks or for further updates.

A variation of this method consists in obtaining the new H'y value which is representative of the result of the Hash function on the whole new program P1 from the control center, represented here by M0 to Mm.

The control data R sent by the control center may include a utilization data describer D that indicates to the decoding unit (IRD) how to use this data. The describer may be in the form of a table that contains all the addresses and destinations of the data. In this way, it will not be possible to use this data without the describer, the latter being sent back to the decoding unit (IRD) only if the comparison is positive.

According to a variation of the invention, the control center includes a warranty to certify the broadcaster of the data with the control data R.

This verification function is connected not only to the downloading of new data in a decoder, but also allows the testing of the validity and authenticity of the data at any moment. In this case, the operation consists of periodically calculating, or according to a request, the representative Hx values of the result of a so-called mono-directional and collision-free function carried out on all or only a part of the data (M0 to Mm) in the operational memory of the decoder, and to transmit this information (H'x) to the security unit for comparison with a reference value (H'y).

To carry out this operation, there is a first method which consists in the calculation being carried out by the decoder, the result being transmitted to the security unit. According to a variation of this method, the calculation is carried out by the security unit, with the data (M0 to Mm) being transmitted from the decoder to the security unit (SC).

The request for these verification operations may come from the control center, from the security unit, from a test unit or from one of the means of communication, even if they are under tension.

While the security unit compares the calculated H'x value with the reference value H'y, the latter may be represented either by the value calculated by the IRD decoder after the confirmation of its validity from the control center, or by the reference value supplied by the control center.

One of the ways in which certain dishonest people use to try and understand how a pay-T.V. system works, is to observe the reaction following an attempt at modifying it. This is why the invention is equally open to a way of transmitting the result of the comparison carried out with another method, for example when the subscriber decides to accept an event, and a subscriber generated message is sent to the control center.

It is useful to include the information that the data M1 to Mn has been changed in the message, otherwise it would be extremely difficult to make the tie between the modification of the data and the blockage of the decoder, that could happen much later.

According to a variation, the value of the result of the calculation Hx is transmitted to the control center. To do this, and to remain hidden, the result is divided up and included piece by piece inside administration messages used by the system.

The control center recomposes the Hx value piece by piece and when the value is complete, determines if there are modifications to the values.

One problem that is encountered when updating a large number of decoders is with the number of requests to the control center to obtain the verification.

One proposed solution in the sphere of this invention is to sub-divide the requests to the control center for a verification in a pseudo-random way.

Another solution previously described consists in sending a preliminary reference value. In this way, if the data is received correctly, which is in the majority of cases, the update can take effect without waiting for a request at the control center. This request will be carried out anyway to confirm that the update has been carried out correctly.

In a particular way of operating, the group considered includes a transmitter part, located inside a control center, and a receiver that can be made up of quite a large number of peripheral units which work in a similar way. The aim is to guarantee that the software sent by the transmission part is received in an authentic and complete way by each of the peripheral units. In line with the terminology used in pay television, which represents an important but not exclusive application of the invention, the peripheral units will be called IRD (Integrated Receiver Decoder) in the following part of the paper, and include a receiver, a decoder to process the signal received by the decoder and a central processing unit, or CPU, that works preferably with a non-volatile memory as in various peripherals.

A non-volatile memory is a memory where the contents are maintained intact even if the main current supply is cut, for example through at least one independent source of energy such as batteries. Other types of non-volatile memories can be used, such as EEPROM, Flash EPROM or FEPROM. It is these non-volatile memories that keep the data safeguarded in case of an interruption in the supply of current, and It is essential to make the IRD processor work well.

The information is received by the IRD coming from the control center, in the form of a stream of data arriving at the receiver of the IRD unit. In the case of coded television, or more in general interactive, the stream of data includes video information, audio information, data information, execute applications and, finally, various types of data check information.

In this case it is a question of guaranteeing that the information is received in the correct way and interpreted by the IRD before being stored in the operational memory, particularly the execute data, that is, the software.

The receiver of the IRD transmits them to a decoder, that then puts them in circulation in the IRD by means of a bus. Connected to the bus there is a specialized multimedia processor that is, in turn, connected to a monitor and to one or more loudspeakers, the aforementioned non-volatile memory and one or more optional sub-devices. It is the IRD processor (CPU) that manages and controls its correct functioning, as well as the different sub-devices, such as an interface, an auxiliary memory pack, other processors or a modem. What is more, the control center may receive exchange information, for example through a modem connected to the public telecommunications network.

These sub-devices themselves could be the source of errors that it then acts upon to detect and correct, especially in the case of the loading of a new version of IRD operating software and particularly of its CPU, or of certain execute programs for the IRD or its components.

The software and the data for which the authenticity and integrity must be guaranteed may be loaded by various means. One of these means, as has already been said, consists in sending the aforementioned receiver an update of the memory with the stream of data, including a number of heading-like data blocks M1, M2, . . . Mn to allow the data M1 to Mn to be easily recognizable for the central unit.

Alternatively, or as a supplement, the data blocks may reach the IRD through one of its optional sub-devices such as the modem, for example.

Within the sphere of the invention, the data blocks M1, M2, . . . Mn may be sent in clear without any drawbacks, that is to say, without yet being ciphered.

The method according to the invention consists, in this form, of applying first of all, during the transmission stage, a mono-directional or Hash function to a part or to all of the data blocks M1, M2, . . . Mn to obtain a representative Hx result of the M1 to Mn group. The data blocks M1 to Mn may be processed separately just the same and obtain the Hx1 result corresponding to M1, Hx2 corresponding to M2 and Hxn corresponding to Mn. This or these Hx results are memorized by the control center for ulterior verification.

A particularly crucial property for the authentication of the data, concerns the systems by which the data is transmitted along public routes such as Hertzian-wave, telephonic or internet routes. In this case, an intruder may take the place of the control center and send data to modify the operation of the target system.

Adding a cryptogram during the transmission of the data to authenticate the latter is well known. None the less, this cryptogram only responds to the need of identifying the author of the data but it has no effect on a decoder that has lost the reference criteria.

The strength of the method resides, in part, in the quality of the mono-directional H function and in the ratification of these signatures by a security unit that is reputed to be impenetrable. In this way, a simple checksum does not allow the exchange of two blocks of characters in the data to be detected because the addition is reputed to be, in mathematics, commutative and associative. On the other hand, a result of a Hash function Hx is a very realistic image of x, even if it is much longer than Hx. If an exchange of characters is carried out in the group of x characters, the H(x) function will detect it immediately, and the system will no longer be able to function following its detection. The result is a security crash.

An important aspect of the invention is that it allows a verification of the validity of the data in the peripheral unit's memory to be carried out at any time. As a matter of fact, the presence of this check information in the security module allows the decoder to carry out an auto-verification. This verification gives a result without comparing it to the checksum normally used in the program memory. If this verification gives a result similar to the reference, the unit has various means (modem connection, cable connection) to inform an external unit, for example the control center, about the non-conformity of the program.

If the preferential means of the invention for generating and transmitting check information is the control center, the invention has a peripheral unit in which all or a part of the program is initially loaded with the check information such as that described above. This can be carried out during fabrication at the moment of initialization before the sale through the processor, or by downloading the check information through one of the peripherals at the moment of an initialization step.

BRIEF DESCRIPTION OF THE DRAWING

The invention is illustrated in the schematic block diagram of an IRD.

DETAILED DESCRIPTION OF THE INVENTION

Figure 1:
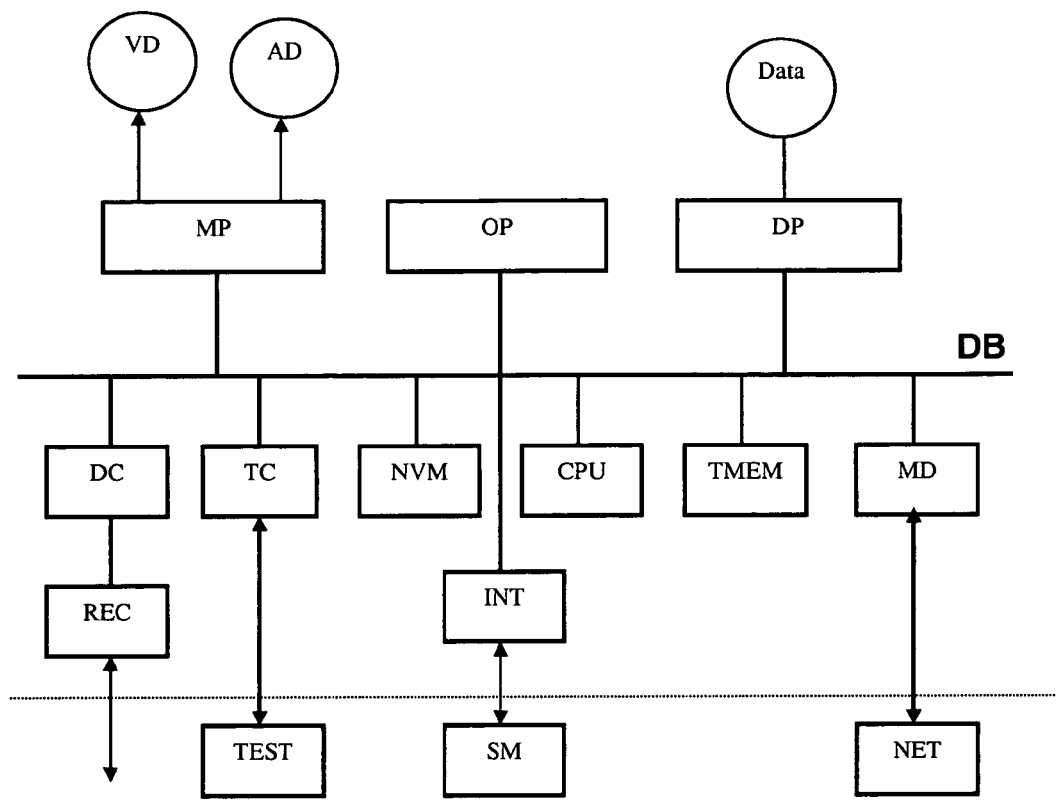
(FIG. 1)

An IRD, or Integrated Receiver Decoder, is represented in this diagram, making up the peripheral part of the system to which the method according to the invention is applied, and in the way described below. This IRD includes a central bus DB to which all the different modules are connected. The central module of the IRD is made up of the CPU processor which has the task of carrying out the various processes.

An REC receiver receives a stream of data including video and audio information, data and execute applications through various support paths such as a cable, a Hertzian antenna, a satellite dish, internet or other known technology. This REC receiver is connected to a DC interface, which is also connected to the bus (DB).

The following are also connected to the bus (DB):
A multimedia processor MP specialized in the processing of video or audio information, that sends it respectively to a monitor VD and loudspeakers AD;
a test channel TC, which can be connected to a tester TEST for factory regulation and for maintenance;
a non-volatile memory NVM, independent from the main power with its own feed source;
an interface INT for a smart card, which physically receives the smart-card SC;
an auxiliary memory or memory pack TMEM;
a modem MD, connected to the public network NET, adopting widely known technology and supports;
other processors OP, DP with various functions according to the needs of the user, in particular those used for data processing;

It is the CPU that controls the updating of the software, an example of which will be described. It accepts or rejects it according to the test results carried out using the method which is the object of this invention.

These software versions of the IRD's CPU may arrive at the IRD through the receiver REC, through the tester TEST, through the smart-card SC or through the network NET. In the following, an example of how a stream of video and audio information arrives at the IRD through the REC receiver will be described.

A set of data, representing a new software version arriving at the IRD, is stored in the temporary memory TMEM of the IRD, with the service information, after being controlled regarding its authenticity and its integrity. This allows the control center to load the software version into a large number of peripherals, and to carry out an error-free installation through the IRD.

Once the message has been received by the IRD, the data is broken up and the different elements are stored in the temporary memory TMEM. The IRD processes the blocks M1 to Mn in the same way as when they were transmitted, but in the opposite order. It is clear that in the case where the blocks are received in ciphered form, the first operation is to decipher the data with the public cipher-key PuK to have the data in clear.

The next step involves carrying out a mono-directional function H on the data blocks M1 to Mn to have a result of the values Hy1 to Hyn. In the case where an error has entered into the memory blocks M1, M2, ... Mn during the transmission of the message, this error will show up on Hy that will be found to be different from Hx which is contained in the control block and the data M1 to Mn will be rejected.

These results are transmitted to the smart-card SC that is in charge of their authentication. As described before, this operation is carried out through a connection to the control center, either immediately or at a later moment.

Examples of the H functions are the functions MD2, MD5 and SHA-1.

According to another variation of the invention, the unit containing the data does not have a communication path with a control center. The data is delivered to a storage unit with the control information (R1) including the result of a mono-directional or collision-free function, called Hash function, carried out on all or a part of the data (M1 to Mn). The particularity of this control data (R1) is that, on the one hand, it contains the hash function for the set of data taken into consideration, while on the other hand that they are stored in a ciphered form k2(Hy). The storage unit can neither understand nor can modify them.

During the verification phase, the storage unit transmits the check information to the security unit in a ciphered form. The security unit contains the means to decipher the information, particularly for extracting the result of the hash function (Hy).

Moreover, according to a first variation, the storage unit carries out the hash function on the data M1 to Mn, calculates the check information Hx and transmits it to the security unit for comparison. In exchange, the security unit sends the return data (R2) to the storage unit, including the result of the comparison.

The storage unit is then in charge of taking the necessary measures in the case where the data is not authentic.

According to a second variation, the calculation of the check information Hx is carried out by the security unit, which in this case receives the data M1 to Mn from the storage unit.

According to a variation giving a higher level of guarantee as far as the use of the data is concerned, a cipher key k3 is added to the control data (R1) to decipher the data M1 to Mn.

This data is initially stored in a ciphered form and the Hash function is made in the ciphered data. When the integrity verification of the data is done for the security unit and the result is positive, the security unit, in the reply data (R2) sent to the storage unit, includes the cipher-key k3 which allows it to decipher the data M1 to Mn.

According to a variation of the method described above, the security unit does not send the cipher-key k3, but it is the storage unit that sends the ciphered data M1 to Mn to the security unit SC for deciphering.

In the same way as the previous method, this control may be carried out at any time during the operation of the storage unit.

The control data (R1) includes a data describer D that indicates to the storage unit how to use the data. This describer can be in the form of a table containing the addresses and the destinations of the data. In this way, it will not be possible to use the data without the describer, the latter being returned to the storage unit only if the comparison is positive.

It is also foreseen that a warrant is added to the control data (R1) which certifies the broadcaster of the data, in order to keep a trace of it in the security unit.

What is claimed is:

1. Method to check the integrity and the authenticity of a data set received by a pay television decoding unit including a decoder, a security unit, and means of communication with a control center, comprising a first step of calculation by said decoding unit of a check information which is representative of the result of a unidirectional and collision-free function, carried out on all or part of the data set, said method comprising further steps of:

transmitting the check information by said decoding unit to the security unit and ciphering said check information with a first cipher-key, sending the ciphered check information to the control center, deciphering of the ciphered check information by the control center and comparison with a reference value of the check information, transmitting control data including the result of the comparison in a ciphered form to the security unit, deciphering of the ciphered result of the comparison by the security unit and informing the decoder of the validity of the data set.

2. The method according to claim 1, wherein the calculation is carried out by the security unit, the data set being transmitted from the decoder to the security unit.

3. The method according to claim 1 comprising the further steps of:

including an utilization describer for the data set in the control data, deciphering the control data and transmitting said describer to the decoder, if the result of the comparison is positive, processing the data set by the decoder according to guidelines contained in said describer.

4. The method according to claim 1, wherein the control center returns, in the control data, the reference value of the check information in a ciphered form to the security unit.

5. The method according to claim 4, wherein the calculation is carried out by the decoder, the result of said calculation being transmitted to the security unit.

6. The method according to claim 1, wherein the data set is accompanied by validity information of said data set, and wherein the security unit transmits to the decoder the information to use or not said validity information for checking the data set.

7. The method according to claim 6, wherein said validity information is of the type of a cyclic redundancy code, a checksum or a code determined with a unidirectional and collision-free function.

8. The method according to claim 1, wherein the control data includes a global check information which is representative of a result of a unidirectional and collision-free function carried out on all or part of a global data set including the received data set or corresponding to the received data set.

9. The method according to claim 8, wherein the control data includes a certificate authenticating the broadcaster of the data set.

10. The method according to claim 8, comprising the steps of calculating periodically, or on request, the global check information, the security unit comparing the result with a reference value of said global check information.

11. The method according to claim 10, wherein the calculation is carried out by the decoder, the result of said calculation being transmitted to the security unit.

12. The method according to claim 10, wherein the calculation is carried out by the security unit, the data set being transmitted from the decoder to the security unit.

13. The method according to claim 10, wherein the periodic calculation is carried out on request from the control center, from the security unit, from a test unit or from one of the means of communication.

14. The method according to claim 10, wherein the result of the comparison is transmitted in a subscription message usual to the functioning of the system.

15. The method according to claim 10, wherein the global check information is transmitted to the control center inside a subscription message usual to the functioning of the system, each message containing only a part of said global check information.

16. The method according to claim 15, wherein the transmission to the control center is carried out in deferred mode, according to a timetable defined in a pseudo-random manner within predefined limits.

* * * * *